United States Patent [19]
Reynolds et al.

[11] Patent Number: 5,821,298
[45] Date of Patent: *Oct. 13, 1998

[54] STABLE COMPOSITIONS COMPRISING AQUEOUS WAX EMULSIONS AND WATER BORNE URETHANE DISPERSIONS

[76] Inventors: Michael A. Reynolds, 8015 Wood Dr., Grosse Ile, Mich. 48138; Lawrence P. Novack, 1 E. Gate Dr., Glenwood, N.J. 07418

[*] Notice: This patent issued on a continued prosecution application filed under 37 CFR 1.53(d), and is subject to the twenty year patent term provisions of 35 U.S.C. 154(a)(2).

[21] Appl. No.: 603,304

[22] Filed: Feb. 20, 1996

[51] Int. Cl.[6] .............................. C08J 3/00; C08K 3/20; C08K 5/06; C08L 75/00
[52] U.S. Cl. ............ 524/591; 106/14.34; 106/31 R; 106/19 E; 106/270; 106/271; 252/310; 252/363.5; 524/275; 524/276; 524/277; 524/279; 524/366; 524/376; 524/377; 524/378; 524/458; 524/460; 524/475
[58] Field of Search ........................ 524/275, 276, 524/366, 277, 460, 458, 279, 376, 377, 378, 475, 591; 106/14.34, 31 R, 19 E, 270, 271; 252/310, 363.5

[56] References Cited

U.S. PATENT DOCUMENTS

| 4,317,755 | 3/1982 | Gregory | 524/276 |
| 4,661,170 | 4/1987 | Osberghaus et al. | 148/6.27 |

FOREIGN PATENT DOCUMENTS 868251  9/1968  Canada .

*Primary Examiner*—Patrick D. Niland
*Attorney, Agent, or Firm*—Joanne P. Will

[57] ABSTRACT

Incorporating highly ethoxylated molecules into the traditional aqueous wax emulsion results in significant improvement in formulation compatibility between the aqueous wax emulsion and the water borne urethane dispersions as evidenced by the increase in formulation clarity and stability

4 Claims, No Drawings

STABLE COMPOSITIONS COMPRISING AQUEOUS WAX EMULSIONS AND WATER BORNE URETHANE DISPERSIONS

FIELD OF THE INVENTION

The present invention relates to aqueous wax emulsions having improved compatibility in water borne urethane dispersions.

BACKGROUND OF THE INVENTION

Aqueous wax emulsions are added to urethane coating formulations to improve mar, scratch, and scuff resistance as well as to modify the coefficient of friction of the cured coatings. Traditionally, these aqueous wax emulsions contain emulsifiable waxes and nonionic surfactants having less than 20 ethylene oxide (EO) units, preferably less than 15 EO units. However, addition of these traditional aqueous wax emulsions to water borne urethane based dispersions leads to a loss in clarity and stability due to the incompatibilities between these traditional aqueous wax emulsions and the water borne urethane dispersions. Moreover, the clarity of these aqueous wax emulsion/water borne urethane dispersion blends is not simply an aesthetic concern. If said blend is not compatible then its stability is diminished. In addition, turbidity in a blend can lead to loss of transparency and loss of integrity of the coatings made from these aqueous wax emulsion/water borne urethane dispersion blends.

The problems encountered in producing stable wax emulsions have been studied in other systems. For example, CA 868251 (assigned to Sun Oil Company) teaches methods to stabilize paraffin and other non-oxidized polyethylene wax emulsions, against thickening due to shaking and freezing, by the addition of ethoxylated molecules. However, the art does not teach or suggest how to stabilize oxidized polyethylene wax emulsion/urethane dispersion blends as Applicants do in the present application.

Applicants have surprisingly discovered that the addition of highly ethoxylated nonionic surfactants to traditional aqueous wax emulsions improves the stability and clarity of said aqueous wax emulsion in a urethane dispersion containing composition.

SUMMARY OF THE INVENTION

The present invention relates to a wax emulsion composition having improved compatibility in urethane dispersions wherein said wax emulsion comprises:

a. 10–50% emulsifiable waxes;

b. 4–20% nonionic surfactants having less than 20 EO units;

c. 1–10% highly ethoxylated molecules having 20–350 EO units; and d. 20–85% water.

Further, the present invention relates to a method for improving the compatibility of a wax emulsion composition in a water borne urethane dispersion comprising incorporating into s aid water borne urethane dispersion a wax emulsion composition comprising:

a. 10–50% emulsifiable waxes;

b. 4–20% nonionic surfactants having less than 20 EO units;

c. 1–10% highly ethoxylated molecules having 20–350 EO units; and d. 20–85% water.

Definitions and Usages of Terms

The term "highly ethoxylated molecule", as used herein, refers to any molecules having 20–350 EO units. Said highly ethoxylated molecules can be polyethylene glycol or polyethylene glycol containing molecules including but not limited to ethoxylated alcohols, alkyl phenols, and alkylene oxide block copolymers.

The term "wax emulsion", as used herein, refers to a dispersion of finely divided wax particles prepared by cooling an emulsion of molten wax, water, emulsifiers, and processing aids, such as antioxidants and alkalis, below the congealing point of the wax such that said wax particles remain discrete.

The term "emulsifiable wax", as used herein, refers to a wax which can be dispersed or suspended in water with or without alteration of its chemical composition. Traditionally, emulsifiable waxes that contain free carboxylic acid and ester groups usually require the addition of surfactants having less than 20 EO units and alkali.

The term "urethane dispersion", as used herein, refers to a water diluted, ungelled, non-sedimenting polyurethane. All percentages are understood to be "% by weight" unless otherwise stated.

DETAILED DESCRIPTION

A wax emulsion composition having improved compatibility in urethane dispersions wherein said wax emulsion comprises:

a. 10–50% emulsifiable waxes;

b. 4–20% nonionic surfactants having less than 20 EO units;

c. 1–10% highly ethoxylated molecules having 20–350 EO units; and d. 20–85% water.

Further, the present invention relates to a method for improving the compatibility of a wax emulsion composition in a water borne urethane dispersion comprising incorporating into said water borne urethane dispersion a wax emulsion composition comprising:

a. 10–50% emulsifiable waxes;

b. 4–20% nonionic surfactants having less than 20 EO units;

c. 1–10% highly ethoxylated molecules having 20–350 EO units; and d. 20–85% water.

Process for Preparing the Wax Emulsions Having Improved Compatibility In Urethane Dispersions The highly ethoxylated molecule can be post added to the traditional aqueous wax emulsion or incorporated during the emulsification process and emulsified according to methods known to those skilled in the art. A general discussion of the emulsification methods used by those skilled in the art is found in *Commercial Waxes,* pp 319–321, 2nd edition, edit by H. Bennett and *The Chemistry and Technology of Waxes,* 1st and 2nd ed., edit by A. H. Warth. Further, BASF Technical Bulletin entitled: LUWAX® Emulsifiable Waxes and Wax Emulsions describes suitable emulsification techniques. LUWAX® is a tradename of BASF AG, Ludwigshafen, Germany. Subsequently, the traditional aqueous wax emulsion which now contains the highly ethoxylated molecules is added to the urethane dispersion to form a stable system with improved clarity and stability as determined by spectophotometry and visual examination.

Ingredients Used In Preparing The Compositions Of The Present Invention Emulsifiable waxes, capable of forming wax emulsions, include, but are not limited to, oxidized polyethylene, ethylene acrylic acid copolymers; and montanic acid and ester waxes available under the LUWAX® tradename. Also suitable are maleic grafted polyolefin waxes, paraffin, other hydrocarbon waxes and vegetable waxes such as carnauba and candelillia. The preferred range for said emulsifiable waxes is 10–50%, more preferred 15 to 40%, and most preferred 20 to 35%. The preferred emulsifiable waxes are oxidized polyethylene, ethylene acrylic copolymers, and maleic grafted polyolefins, more preferred are oxidized polyethylene and ethylene acrylic copolymers.

Highly ethoxylated molecules include, but are not limited to, polyethylene glycol, preferably of molecular weight 1000–20,000, more preferred molecular weight of 5000–15,000; most preferred molecular weight of 6000–12000; highly ethoxylated alcohol ethoxylates, represented by the PLURAFAC® line available from BASF Corporation, Mt. Olive, N.J.; highly ethoxylated alkyl phenols represented by the ICONOL® line available from BASF Corporation, Mt. Olive, N.J.; and highly ethoxylated ethylene oxide/propylene oxide block copolymers represented by the TETRONIC® and PLURONIC® lines available from the BASF Corporation, Mt. Olive, N.J. The preferred range for the highly ethoxylated molecules is 1–10%, more preferred 1 to 7% and most preferred 1 to 5%. The preferred highly ethoxylated molecules are polyethylene glycol, alcohol ethoxylates, and alkylene oxide block copolymers.

Nonionic surfactants having less than 20 EO units include, but are not limited to, ALPHONIC® (alcohol ethoxylates) available from Vista, NEODOL® (alcohol ethoxylates) available from Shell, TERGITOL® (alcohol ethoxylate and alkyl phenol ethoxylate) available from Union Carbide, and ICONOL (alcohol ethoxylate and alkyl phenol ethoxylate) available from BASF.

Urethane dispersions include, but are not limited to, those described in detail in U.S. Pat. No. 4,046,729; 4,066,591; and 4,147,679, all assigned to PPG Industries, incorporated by reference herein.

TABLE I

Aqueous Wax Emulsions

| | Emulsion | | | | | | |
|---|---|---|---|---|---|---|---|
| | 1 | 2 | 3 | 4 | 5 | 6 | 7 |
| Surfactant | | | | | | | |
| Iconol ® DA-6 [%] | 6.0 | 6.0 | 3.0 | 5.9 | 5.8 | 8.0 | 6.7 |
| Iconol ® DA-9 [%] | | | 3.0 | | | | |
| Highly Ethoxylated Molecules | | | | | | | |
| Pluronic ® F-87 [%] | | | | | 2.1 | | |
| Plurafac ® A-38 [%] | | | | | | | 3.0 |
| Plurafac ® A-39 [%] | | | | 2.1 | | 1.8 | |
| Pluracol ® E-8000 [%] | | 1.3 | | | | | |

ICONOL® DA 6 and DA 9 are decyl alcohol ethoxylates available from BASF Corporation. They are not highly ethoxylated, i.e. they contain 6 and 9 moles of EO respectively.

PLURONIC® F-87 is a highly ethoxylated nonionic surfactant available from BASF Corporation.

PLURAFAC® A 38 and 39 are highly ethoxylated linear alcohol alkoxylates available from BASF Corporation.

PLURACOL® E-8000 is a highly ethoxylated polyethylene glycol of molecular weight 8000 available from BASF Corporation.

The following Example represents a traditional wax emulsion based on LUWAX OA 3 oxidized polyethylene wax.

| | |
|---|---|
| 22.4% | LUWAX OA 3 wax |
| 6.0% | Nonionic surfactants having less than 20 EO units (e.g. ICONOL DA 6) |
| 0.4% | KOH |
| 0.4% | Diethylethanolamine |
| 0.2% | Sodium metabisulfite |
| 22.6% | Water (room temperature) |
| 48.8% | Water (95° C.) |

The procedure for preparing such a traditional wax emulsions consists of the following steps:

1. The first six ingredients listed below are charged into an autoclave at room temperature and flushed with nitrogen for three minutes.

2. The autoclave is closed and heated to 145° C. with stirring. This temperature is maintained for 30 minutes.

3. The 95° C. water is added with pressure and heated again to 145° C. for 15 minutes.

4. The composition is cooled rapidly to room temperature with stirring.

The wax emulsions of the present invention are prepared as described hereinabove except that highly ethoxylated surfactants are also added and the corresponding amount of water is left out. Further, the wax emulsions of the present invention are prepared by post adding the aforesaid highly ethoxylated molecules to the previously prepared traditional wax emulsions.

The compatibility of the aqueous wax emulsion/highly ethoxylated molecule composition with water borne urethane dispersions is determined by measuring the percent light transmission of urethane/wax emulsion mixtures as indicated in Table 2. The % transmission is measured in a 1 cm cell at 600 nm. The blank contains urethane dispersion only and no wax solids. Mixtures of 27% water borne urethane dispersion solids and 3% wax emulsion solids are prepared using the aqueous wax emulsions in Table 1 and NEO-REZ R9637®. NEO-REZ R9637 is a high solids water borne urethane dispersion available form Zeneca Resins, Wilmington, Mass.

TABLE 2

Percent Transmission of Wax/Urethane Mixtures

| Emulsion | Surfactants | Highly Ethoxylated Molecules | Initial % T | 30 Days at 50° C., % T | 50 Days at 45° C., % T |
|---|---|---|---|---|---|
| 1 | Iconol DA-6 | | 77.6 | 64.3 | 66.4 |
| 2 | Iconol DA-6 | Pluracol E-8000 | 83.3 | 75.6 | 75.5 |
| 3 | Iconol DA-6 / DA-9 | | 75.3 | 65.6 | 68.5 |
| 4 | Iconol DA-6 | Plurafac A-39 | 80.6 | — | 73.5 |

TABLE 2-continued

Percent Transmission of Wax/Urethane Mixtures

| Emulsion | Surfactants | Highly Ethoxylated Molecules | Initial % T | 30 Days at 50° C., % T | 50 Days at 45° C., % T |
|---|---|---|---|---|---|
| 5 | Iconol DA-6 | Pluronic F-87 | 79.4 | — | 69.4 |
| 6 | Iconol DA-6 | Plurafac A-39 | 82.3 | — | 73.6 |
| 7 | Iconol DA-6 | Plurafac A-38 | 82.1 | — | 79.4 |
| Commercial OA 3 emulsion I | | | — | 51.7 | — |
| Commercial OA 3 emulsion II | | | — | 52.3 | — |
| Blank (no wax) | | | 89.6 | 88.4 | 90.7 |

Commercial Emulsions I and II are traditional emulsions prepared using nonionic surfactants having less than 20 EO units.

Table 2 illustrates the utility of the Applicants' invention. The addition of highly ethoxylated molecules to the aqueous wax emulsions improves the compatibility between the wax emulsion and the aqueous urethane dispersion. The improved compatibility can be followed by the increased clarity of the blends of the present invention. Clarity, and thus also compatibility, can be followed by measuring the percent light transmission of the blends. As clarity increases, the percent light transmission increases. The higher percent light transmission values for the examples that contain highly ethoxylated molecules demonstrates the improved compatibility of said blends.

We claim:

1. A method for improving the compatibility of a wax emulsion composition in a urethane dispersion comprising incorporating into said urethane dispersion a wax emulsion composition comprising:

a. 10–50% emulsifiable waxes;
b. 4–20% nonionic surfactants having less than 20 EO units;
c. 1–10% highly ethoxylated molecules having 20–350 EO units; and
d. 20–85% water.

2. A method according to claim 1, wherein said emulsifiable waxes are selected from the group consisting of polyethylene, ethylene acrylic copolymers, and maleic grafted polyolefins.

3. A method according to claim 1, wherein said highly ethoxylated molecules are selected from the group consisting of polyethylene glycol, alcohol ethoxylates, and alkylene oxide block copolymers.

4. A method according to claim 1 wherein said emulsifiable wax is oxidized polyethylene or ethylene acrylic copolymers and said highly ethoxylated molecule is polyethylene glycol or alkylene oxide block copolymers.

* * * * *